(12) United States Patent
Harmon et al.

(10) Patent No.: US 10,701,193 B2
(45) Date of Patent: *Jun. 30, 2020

(54) HINGED ELECTRONIC DEVICE WITH MOVING SUPPORT PLATES FOR A FLEXIBLE DISPLAY AND CORRESPONDING SYSTEMS

(71) Applicant: Motorola Mobility LLC, Chicago, IL (US)

(72) Inventors: Roger Harmon, Crystal Lake, IL (US); Steve Emmert, McHenry, IL (US); Alberto Cavallaro, Northbrook, IL (US); Jee-Woong Lee, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,721

(22) Filed: Jan. 22, 2020

(65) Prior Publication Data

US 2020/0162595 A1    May 21, 2020

Related U.S. Application Data

(63) Continuation of application No. 16/579,517, filed on Sep. 23, 2019, which is a continuation of application (Continued)

(51) Int. Cl.
*H04M 1/02* (2006.01)
*G06F 1/16* (2006.01)
*H04B 1/3888* (2015.01)

(52) U.S. Cl.
CPC ........ *H04M 1/0214* (2013.01); *G06F 1/1616* (2013.01); *G06F 1/1652* (2013.01);
(Continued)

(58) Field of Classification Search
CPC .... G06F 1/1681; G06F 1/1652; G06F 1/1616; G06F 1/1615; G06F 1/1641;
(Continued)

(56) References Cited

U.S. PATENT DOCUMENTS 4,483,394 A     11/1984  Peppers et al.
6,377,324 B1    4/2002   Katsura
(Continued)

OTHER PUBLICATIONS

Car Door Hinge; Image; Unknown Image Source; Unknown publication date but prior to fling of present application.
(Continued)

*Primary Examiner* — Nam T Huynh
(74) *Attorney, Agent, or Firm* — Philip H. Burrus, IV

(57) ABSTRACT

An electronic device includes a first device housing and a second device housing. Each can optionally define a linear recess. A hinge couples the first device housing to the second device housing. The first device housing is pivotable about the hinge relative to the second device housing. A flexible display is situated in the linear recess, where included, and spans the hinge. The hinge includes a cam, a first support plate pivotally coupled to a first side of the cam, and a second support plate pivotally coupled to a second side of the cam. The first support plate, the cam, and the second support plate bridge the linear recess of each device housing when the electronic device is in an axially displaced open position, but define boundaries within which the flexible display defines a service loop when the electronic device is in a closed position.

20 Claims, 8 Drawing Sheets

Related U.S. Application Data

No. 16/131,937, filed on Sep. 14, 2018, now Pat. No. 10,491,725.

(52) U.S. Cl.
CPC ........ *H04B 1/3888* (2013.01); *H04M 1/0268* (2013.01); *G06F 1/1681* (2013.01); *H04M 1/0216* (2013.01)

(58) Field of Classification Search
CPC . G06F 1/1618; H04M 1/0216; H04M 1/0268; H04M 1/022; H04M 1/0247; H04M 1/0214; H04M 1/0218
See application file for complete search history.

(56) References Cited

U.S. PATENT DOCUMENTS

| | | |
|---|---|---|
| 6,402,713 B1 | 6/2002 | Doyle |
| 7,714,801 B2 | 5/2010 | Kimmel |
| 8,028,555 B2 | 10/2011 | Lurie |
| 8,773,849 B2 | 7/2014 | Bohn |
| 8,982,542 B2 | 3/2015 | Bohn |
| 9,235,239 B2 | 1/2016 | van Dijk et al. |
| 9,535,465 B2 | 1/2017 | Bohn |
| 9,600,035 B2 | 3/2017 | Park et al. |
| 10,054,990 B1 | 8/2018 | Harmon |
| 10,063,677 B2 | 8/2018 | Cavallaro et al. |
| 10,104,790 B2 | 10/2018 | Lee et al. |
| 10,110,717 B1 | 10/2018 | Liu |
| 10,485,115 B1 | 11/2019 | Cromer et al. |
| 2004/0226138 A1 | 11/2004 | Harmon |
| 2012/0002360 A1 | 1/2012 | Seo |
| 2012/0162866 A1 | 6/2012 | Bohn |
| 2012/0264489 A1 | 10/2012 | Choi et al. |
| 2013/0037228 A1 | 2/2013 | Verschoor et al. |
| 2013/0342094 A1 | 12/2013 | Walters |
| 2014/0042293 A1 | 2/2014 | Mok |
| 2014/0287804 A1 | 9/2014 | Bohn |
| 2015/0261259 A1 | 9/2015 | Endo et al. |
| 2016/0143162 A1 | 5/2016 | Van Dijk et al. |
| 2016/0302314 A1 | 10/2016 | Bae |
| 2017/0115701 A1 | 4/2017 | Bae et al. |
| 2017/0264723 A1 | 9/2017 | Mok |
| 2018/0059728 A1 | 3/2018 | Kim et al. |

OTHER PUBLICATIONS

Pemko CFM83 Full-Mortise Continuous Geared Hinge; https://www.qualitydoor.com/pemko-cfm83-continuous-hinge.html; Sited Visited Feb. 2017; Unknown Publication Date but prior to filing of present application.

Spectacle Hinged—Cam Mechanism; Image; Unknown source; Image obtained prior filing of present application.

"Existing Solutions Provided by Inventor", Solution 1: Clip Type; Solution 2: outward foldable; Unknown publication date but prior to filing of present application.

"Picture of Samsung Concept Phone", Unknown publication date and source; Prior to May 1, 2018.

"Related Art Provided by Inventor", Document with list and pictures of foldable concepts; Viper and Voyager folding screens; Unknown source; Unknown publication date but prior to filing of present application.

"Samsung Galaxy X—Galaxy Fold", YouTube Video; Posted by Stuffbox on Jan. 20, 2018; https://www.youtube.com/watch?v=T-mvKaVsJOE.

Bui, Hung , "Notice of Allowance", U.S. Appl. No. 16/016,316, filed Jun. 22, 2018; dated Aug. 6, 2019.

Bui, Hung S. , "NonFinal OA", U.S. Appl. No. 16/016,316, filed Jun. 22, 2018; dated Apr. 30, 2019.

Diaconescu, Adrian , "Samsung Display crushes all hope of foldable 'Galaxy X' phone release until 2019", Published on Apr. 4, 2017; https://pocketnow.com/samsung-display-foldable-galaxy-x-phone-2019-release-plans.

Divyarashmi, "Samsung Galaxy X, Samsung's Foldable Display Phone is Coming Soon", Published Oct. 3, 2017; http://techstepper.com/samsungs-foldable-display-phone-is-coming-soon/.

Eich, Martine , "PCT Search Report and Written Opinion", PCT Application No. PCT/US2019/023925; Filed Mar. 25, 2019; dated May 17, 2019.

Huynh, Nam Trung , "NonFinal Office Action", U.S. Appl. No. 16/131,937, filed Sep. 14, 2018; dated Mar. 28, 2019.

Huynh, Nam Trung , "Non-Final Office Action", U.S. Appl. No. 16/597,517, filed Sep. 23, 2019; dated Oct. 29, 2019.

Huynh, Nam Trung , "Notice of Allowance", U.S. Appl. No. 16/131,937, filed Sep. 14, 2018; dated Sep. 12, 2019.

Thaker, Nidhi , "Notice of Allowance", U.S. Appl. No. 15/610,368, filed May 31, 2017; dated Jun. 5, 2018.

Thaker, Nidhi Vivek , "NonFinal OA", U.S. Appl. No. 15/610,368, filed May 31, 2017; dated Jan. 24, 2018.

Bui, Hung , "NonFinal Office Action", U.S. Appl. No. 16/520,174, filed Jul. 23, 2019; dated Mar. 4, 2020.

Huynh, Nam Trung , "Notice of Allowance", U.S. Appl. No. 16/579,517, filed Sep. 23, 2019; dated Feb. 5, 2020.

HINGED ELECTRONIC DEVICE WITH MOVING SUPPORT PLATES FOR A FLEXIBLE DISPLAY AND CORRESPONDING SYSTEMS

CROSS REFERENCE TO PRIOR APPLICATIONS

This application is a continuation application claiming priority and benefit under 35 U.S.C. § 120 from U.S. application Ser. No. 16/579,517, filed Sep. 23, 2019, which is a continuation application claiming priority and benefit to U.S. application Ser. No. 16/131,937, filed Sep. 14, 2018, which is incorporated by reference for all purposes.

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. People use these devices for many different purposes including, but not limited to, voice communications and data communications for text messaging, Internet browsing, commerce such as banking, and social networking.

Mobile devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. Users may prefer the latter for a variety of reasons. Clamshell devices, when folded, generally have a smaller form factor than do candy bar devices. They therefore fit more easily in a pocket. Next, clamshell devices provide protection from the display when folded. This is in contrast to candy bar devices where the display is always exposed. It would thus be desirable to have an improved hinged electronic device.

Figure 1:
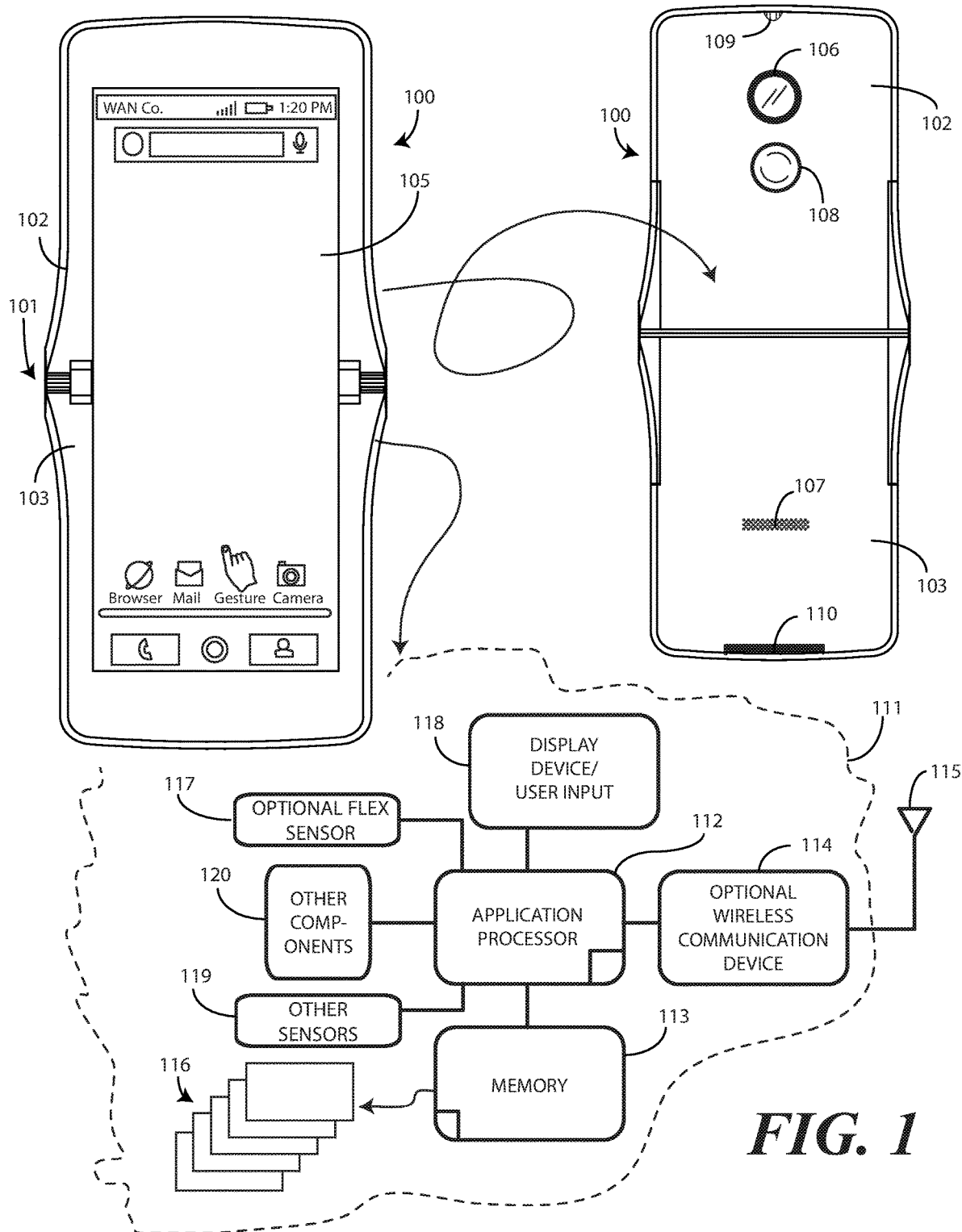
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge couples the first device housing to the second device housing so that the first device housing is pivotable about the hinge relative to the second device housing to one or more of a bent configuration, a folded configuration, or other configuration. In one or more embodiments, a flexible display is coupled to the first device housing and the second device housing and spans the hinge. The flexible display deforms when the first device housing pivots about the hinge relative to the second device housing.

In one or more embodiments, the hinge not only facilitates the bending operation, but also works to improve the reliability and usability of the flexible display. In one or more embodiments, the hinge does this via the use of one or more support plates that are coupled to the cam and are pivotable about the cam when the first device housing pivots about the hinge relative to the second device housing.

In one or more embodiments, a first support plate is pivotally coupled to a first side of the cam. The first support plate then extends distally into the first device housing from the first side of the cam. Similarly, a second support plate is pivotally coupled to a second side of the cam. The second support plate extends distally into the second device housing from the second side of the cam.

The cam and its corresponding support plates serve two functions. First, they provide mechanical support for the flexible display when the first device housing has pivoted about the hinge relative to the second device housing to an axially displaced open position. However, when the first device housing pivots about the hinge relative to the second device housing to a closed position in which interior surfaces of the first device housing and the second device housing abut, the support plates translate along inclined planes within the first device housing and second device housing, respectively, to recede into the first device housing and second device housing. Said differently, when the first device housing pivots about the hinge relative to the second device housing to the closed position, the support plates move toward the exterior surfaces of the first device housing and the second device housing, thereby receding "outward" from the interior surfaces of the first device housing and the second device housing. This "collapse" of the first support plate and the second support plate creates a cavity in the hinge portion of the electronic device that allows the flexible display to form a service loop when the electronic device is in the closed position. The service loop prevents the flexible display from being damaged or developing memory in the folded position when the electronic device is in the closed position.

Embodiments of the disclosure contemplate that bending operations occurring in a housing of an electronic device with a flexible display can present technical challenges. Illustrating by example, it can be difficult to provide uniform mechanical support beneath the flexible display when the electronic device is in the open position. It can further be difficult to limit deformation due to bending operations such that the deformation occurs within a predefined radius.

Advantageously, embodiments of the disclosure provide solutions to each one of these challenges. Specifically hinges configured in accordance with one or more embodiments of the disclosure provide a solution that provides the needed system flexibility by providing support for the flexible display when in the open position, but allows for a large radius service loop of the flexible display to occur when the electronic device is in the closed position.

In one or more embodiments, each of the first device housing and the second device housing defines a support plate receiving recess at the hinged portion of the electronic device. In one or more embodiments, these support plate receiving recesses each comprise an inclined plane, which is physically separated from the cam of the hinge by a predefined distance. A distal end of each support plate contacts the inclined plane to translate along the inclined plane when the first device housing pivots about the hinge relative to the second device housing. Thus, if a first side of a first support plate is coupled to the cam, a second, distal side of the first support plate contacts the inclined plane in the support plate receiving recess of the first device housing. The second, distal side of the first support plate then translates along the inclined plane when the first device housing pivots about the hinge relative to the second device housing. A second support plate and support plate receiving recess can be similarly configured in the second device housing.

The distal ends of each of the first support plate and the second support plate therefore travel, in one or more embodiments, along their respective inclined planes between a first position within the first device housing and the second device housing, respectively, to a second position within the first device housing and the second device housing, respectively, when the first device housing and the second device housing pivot about the hinge from an axially displaced open position to a closed position. In one or more embodiments, the support plates are closer to the flexible display when in the first position, and are farther from the flexible display when in the second position. In one or more embodiments, the support plates are farther from exterior surfaces of the first device housing and the second device housing when in the first position, but are closer to those outer surfaces of the first device housing and the second device housing when in the second position. This results in the second position being deeper within the first device housing and the second device housing, respectively, than the first position.

In one or more embodiments, the flexible display is positioned within a linear recess of the first device housing and the second device housing so that it—or a fascia disposed atop the flexible display—can be flush with the interior surfaces of the first device housing and second device housing, respectively. In other embodiments, the linear recess will be omitted and the flexible display will simply sit atop planar interior surfaces of the first device housing and the second device housing. In either embodiment, when the first device housing pivots about the hinge relative to the second device housing to the axially displaced, open position, the first support plate, the cam, and the second support plate bridge the linear recess (or planar interior surfaces) to provide mechanical support for the flexible display. By contrast, by receding into the housings, the first support plate, the cam, and the second support plate define boundaries within which the flexible display defines a service loop when the first device housing and the second device housing pivot about the hinge from the axially displaced open position to a closed position.

Embodiments of the disclosure thus provide a novel hinge mechanism that properly supports a flexible display when a hinged electronic device is in the open position. Embodiments of the disclosure contemplate that the mechanical stack of the flexible display is frequently too soft or flexible to support itself. Accordingly, when the electronic device is in the open position the support plates provide rigid support across the hinge portion of the electronic device. At the same time, the support plates receded into the housing when the electronic device is folded to allow the flexible display to form a service loop. Advantageously, the cam and corresponding support plates define kinematic linkages that move when the first device housing pivots about the hinge relative to the second device housing to the closed position. As noted above, the support plates recede backwards (along the Z-axis) to provide space for the flexible display to bend into a teardrop shaped service loop. In one or more embodiments, one or both of the first device housing or the second device housing can also include a spring loaded support plate that stretches the flexible display when the electronic device is in the open position.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display.

In one embodiment, the display 105 is configured as an organic light emitting diode (OLED) display fabricated on a flexible plastic substrate. This allows the display 105 to be flexible so as to deform when the first device housing 102 pivots about the hinge 101 relative to the second device housing 103. However, it should be noted that other types of displays would be obvious to those of ordinary skill in the art having the benefit of this disclosure.

In one or more embodiments, an OLED is constructed on flexible plastic substrates can allow the display 105 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending.

Other displays can be configured to accommodate both bends and folds. In one or more embodiments the display 105 may be formed from multiple layers of flexible material such as flexible sheets of polymer or other materials. In this illustrative embodiment, the display 105 is coupled to the first device housing 102 and the second device housing 103. Accordingly, the display 105 spans the hinge 101 in this embodiment.

Features can be incorporated into the first device housing 102 and/or the second device housing 103. Examples of such features include an optional camera 106 or an optional speaker port 107, which are shown disposed on the rear side of the electronic device 100 in this embodiment, but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments.

In one embodiment, the electronic device 100 includes one or more connectors 109,110, which can include an analog connector, a digital connector, or combinations thereof. In this illustrative embodiment, connector 109 is an analog connector disposed on a first end, i.e., the top end as viewed in FIG. 1, of the electronic device 100, while connector 110 is a digital/power connector disposed on a second end opposite the first end, which is the bottom end as viewed in FIG. 1.

A block diagram schematic 111 of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 114 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
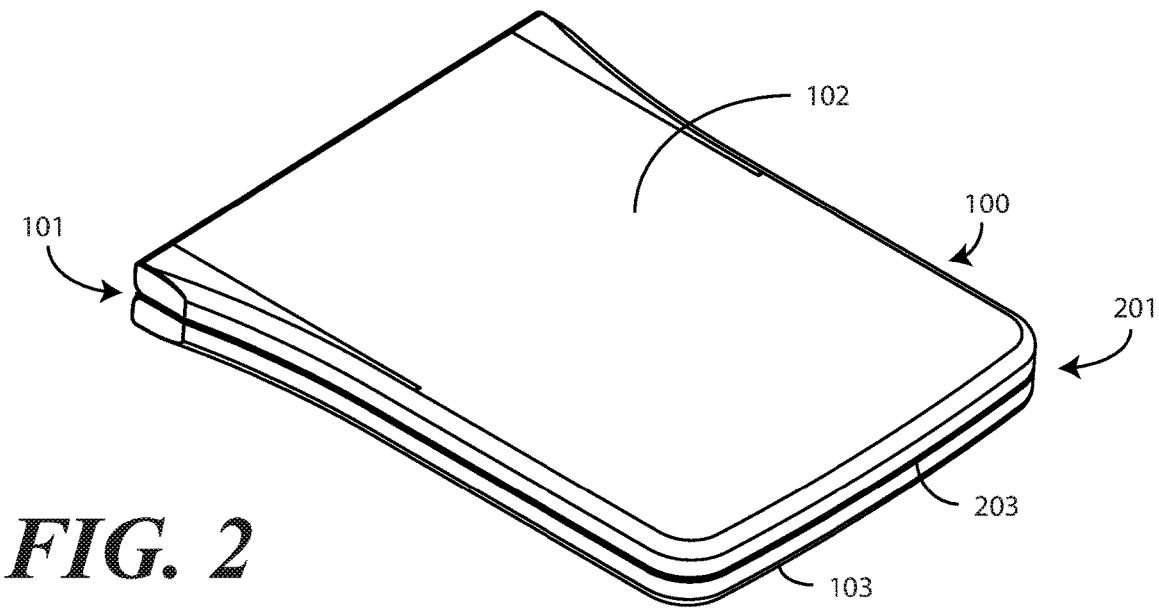
FIG. 2 illustrates a perspective view of one explanatory electronic device in accordance with one or more embodiments of the disclosure in a closed position.
Figure 3:
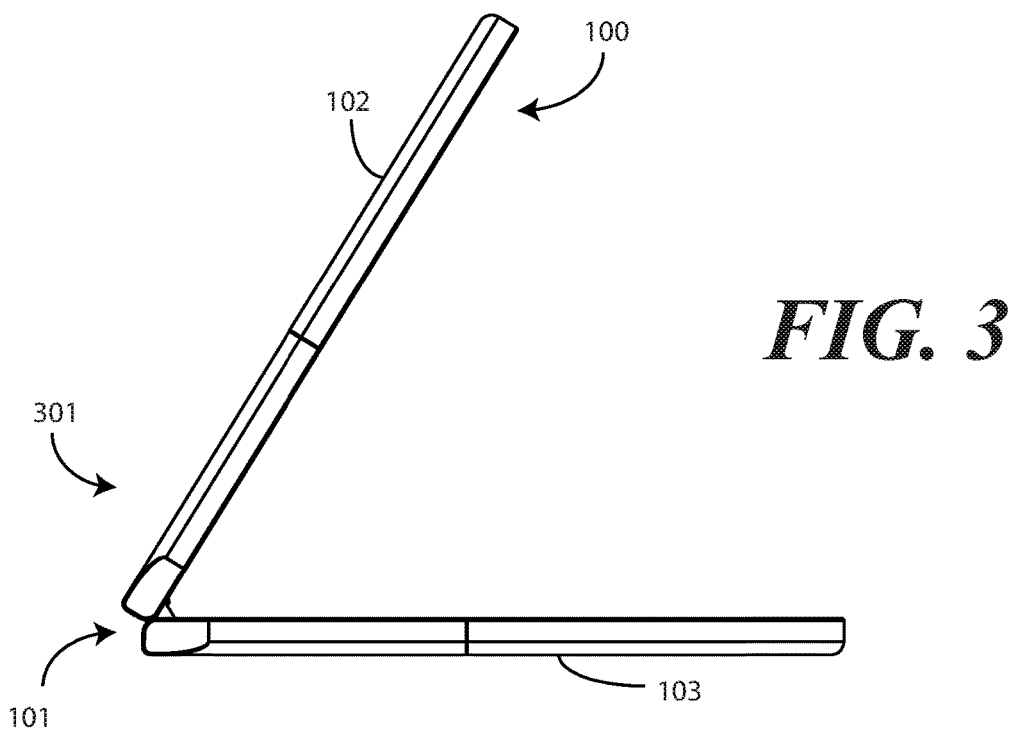
FIG. 3 illustrates a side elevation view of one explanatory electronic device in accordance with one or more embodiments of the disclosure in a partially open position.

In one embodiment, the electronic device 100 includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the flex sensors 117 comprise passive resistive devices manufactured from a material with an impedance that changes when the material is bent, deformed, or flexed. By detecting changes in the impedance as a function of resistance, the one or more processors 112 can use the one or more flex sensors 117 to detect bending of the first device housing 102 about the hinge 101 relative to the second device housing 103. In one or more embodiments, each flex sensor 117 comprises a bi-directional flex sensor that can detect flexing or bending in two directions. In one embodiment, the one or more flex sensors 117 have an impedance that increases in an amount that is proportional with the amount it is deformed or bent.

In one embodiment, each flex sensor 117 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 117 bends, the impedance of the resistive layer changes, thereby altering the flow of current for a given voltage. The one or more processors 112 can detect this change to determine an amount of bending. Taps can be added along each flex sensor 117 to determine other information, including the amount of bending, the direction of bending, and so forth. The flex sensor 117 can further be driven by time-varying signals to increase the amount of information obtained from the flex sensor 117 as well. While a multi-layered device as a flex sensor 117 is one configuration suitable for detecting at least a bending operation occurring to deform the electronic device 100 and a geometry of the electronic device 100 after the bending operation, others can be used as well. Other types of flex sensors 117 will be obvious to those of ordinary skill in the art having the benefit of this disclosure.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge 101 toward the second device housing 103 to a closed position 201. When in the closed position 201, a front surface 202 of the first device housing 102 abuts a front surface 203 of the second device housing 103. Effectively, the first device housing 102 and the second device housing 103 are analogous to clam shells that have been shut by the claim, thereby giving rise to the "clamshell" style of device.

In some embodiments, features can be included to further retain the electronic device 100 in the closed position 201. Illustrating by example, in another embodiment, a mechanical latch can be included to retain the first device housing 102 and the second device housing 103 in the closed position 201. In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 201. In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 201 will be obvious to those of ordinary skill in the art having the benefit of this disclosure.

Turning now to FIG. 3, the electronic device 100 is shown being transitioned from the closed position (201) of FIG. 2 to a partially open position. Specifically, the first device housing 102 is pivoting about the hinge 101 away from the second device housing 103 toward an open position. The position shown in FIG. 3 is a "tent position" 301.

Figures 4, 5:
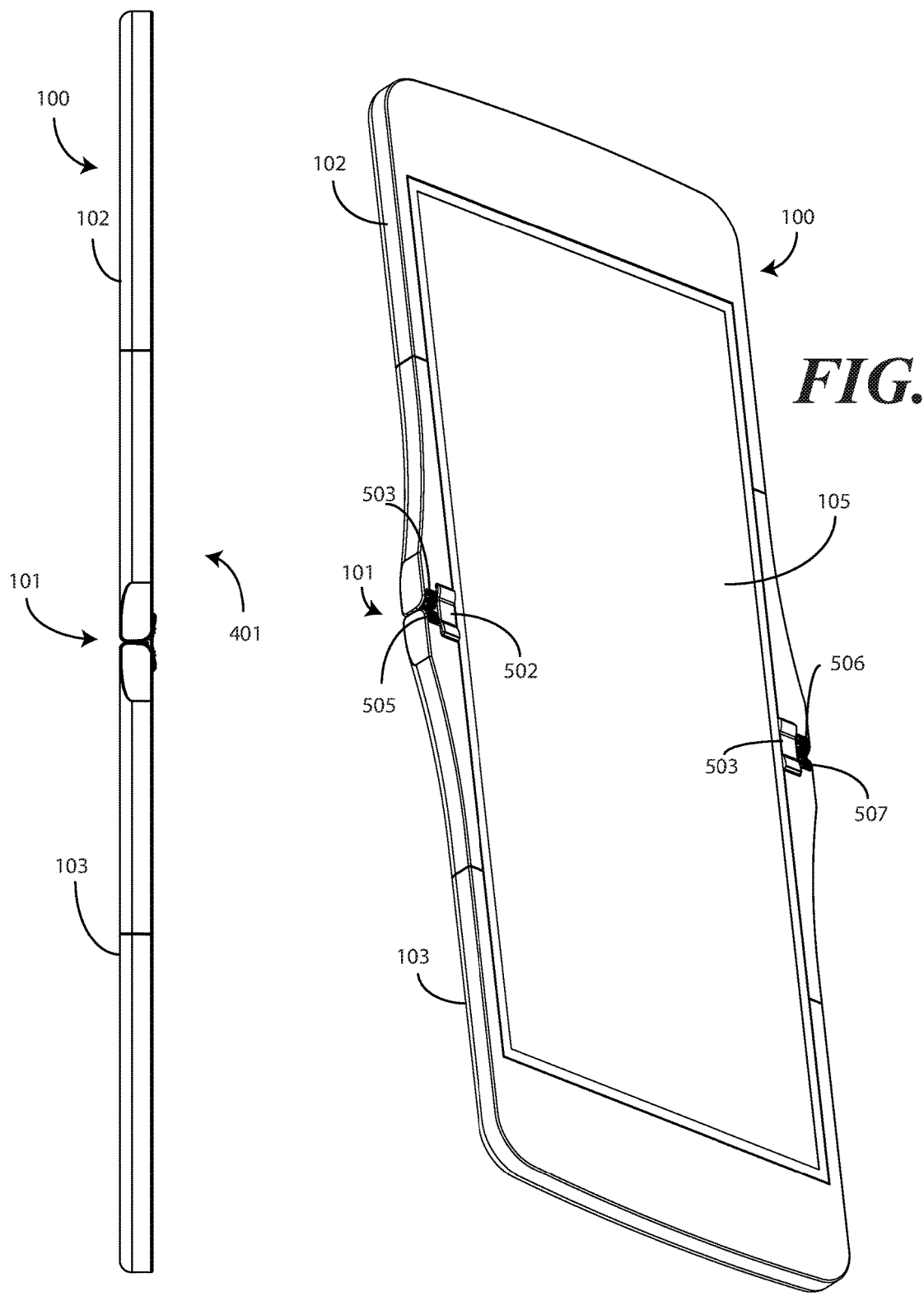
FIG. 4 illustrates a side elevation view of one explanatory electronic device in accordance with one or more embodiments of the disclosure in an open position.
FIG. 5 illustrates a perspective view of one explanatory electronic device in accordance with one or more embodiments of the disclosure in the open position.

Turning now to FIGS. 4 and 5, illustrated therein is the electronic device 100 in an open position 401. In the open position, the first device housing 102 is rotated about the hinge 101 180-degrees out of phase with the second device housing 103 such that the first device housing 102 and the second device housing 103 effectively define a plane. The display 105 has been elongated into a flat position.

With particular attention to FIG. 5, one or more components of the hinge 101 can be seen. In this illustrative embodiment, the hinge 101 includes a cam. A first side 502 of the cam can be seen on one side of the display 105, while a second side 503 of the cam can be seen on another side of the display 105. Optionally, a first toothed wheel 504 and a second toothed wheel 505 can be disposed adjacent to the first side 502 of the cam 502. Where included, the toothed wheels 504,505 can engage to create a symmetric angular rotation of the first device housing 102 and the second device housing 103 when the first device housing 102 pivots about the hinge 101 relative to the second device housing 103.

In one or more embodiments an optional third toothed wheel 506 and an optional fourth toothed wheel 507 are situated adjacent to the second side 503 of the cam to perform the same function. In this illustrative embodiment, the cam is situated farther interior of the electronic device 100 than are the first toothed wheel 504, the second toothed wheel 505, the third toothed wheel 506, or the fourth toothed wheel 507. Said differently, in this embodiment the cam sits between the engagement of the first toothed wheel 504 and the second toothed wheel 505, and the engagement of the third toothed wheel 506 and the fourth toothed wheel 507.

Figure 6:
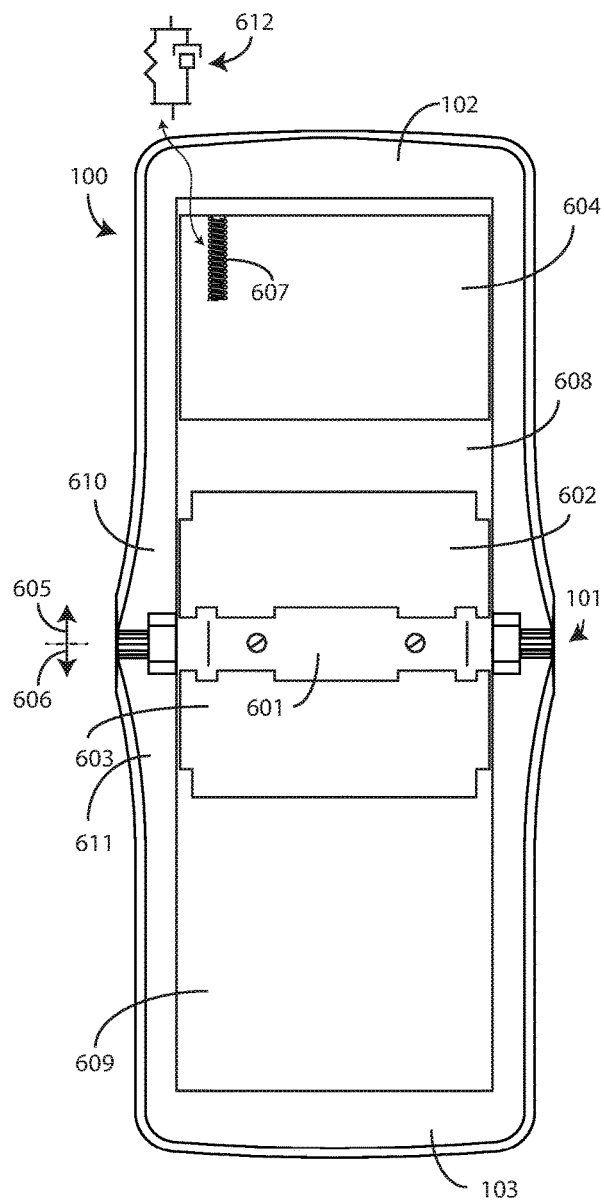
FIG. 6 illustrates a plan view of one explanatory electronic device in accordance with embodiments of the disclosure with the flexible display removed so that the hinge is visible.

Turning now to FIG. 6, the electronic device 100 is shown with the flexible display (105), as well as any overlaying fascia, removed so that additional details of the hinge 101 can more readily be seen. As shown in FIG. 6, in one or more embodiments the hinge 101 comprises the cam 601, a first support plate 602 pivotally coupled to a first side 605 of the cam and extending distally into the first device housing 102 from the first side 605 of the cam 601, and a second support plate 603 pivotally coupled to a second side 606 of the cam 601 and extending distally into the second device housing 103 from the second side of the cam 601.

In one or more embodiments, the first device housing 102 and the second device housing 103 each define linear recesses 608,609 into which the flexible display may be positioned. In one or more embodiments, the flexible display (105) is positioned within the linear recess 608 of the first device housing 102 and the linear recess 609 of the second device housing 103 so that it—or a fascia disposed atop the flexible display (105)—sits flush with the interior surface 610 of the first device housing 102 and the interior surface 611 of the second device housing 103. In other embodiments, the linear recess 608,609 will be omitted, and the flexible display (105) and any accompanying fascia will simply sit atop planar surfaces defined by the interior surface 610 of the first device housing 102 and the interior surface 611 of the second device housing 103.

Where the linear recesses 608,609 are included, the flexible display (105) can be positioned within these linear recesses 608,609 to span the hinge 101. Regardless of whether the linear recesses 608,609 are included, when the first device housing 102 pivots about the hinge 101 relative to the second device housing 103 to the axially displaced, open position shown in FIG. 6, the first support plate 602, the cam 601, and the second support plate 603 bridge the linear recesses 608,609 (or planar interior surfaces in the other embodiment) to provide positive mechanical support for the flexible display (105).

Where electrical components, e.g., processors, memories, communication circuits, and other component described in the schematic block diagram (111) of FIG. 1 are positioned in each of the first device housing 102 and the second device housing 103, a flexible conductor (not shown) can be included between the hinge 101 and the flexible display (105). The flexible conductor, which can bend as the first device housing 102 and the second device housing 103 pivot about the hinge 101 to the closed position (201), allows electrical signals to pass back and forth between circuit components disposed in the first device housing 102 and the second device housing 103. In some embodiments, the flexible conductor can provide additional mechanical support for the flexible display when the first device housing 102 and the second device housing 103 pivot about the hinge 101 to the closed position (201) as well.

In one or more embodiments, one or more spring-loaded trays can be included within one or both of the first device housing 102 or the second device housing 103. In the illustrative embodiment of FIG. 6, a tray 604, which is spring loaded and slidable, and which is disposed within the first device housing 102, is visible. It should be noted that while the tray 604 is shown only in the first device housing 102 in this illustrative embodiment, it could be disposed in the second device housing 103 as well. Additionally, in other embodiments both the first device housing 102 and the second device housing 103 could include trays as well.

In one or more embodiments, a first end of the flexible display (105) can be coupled to the second device housing 103. The second end of the flexible display (105) can then be coupled to the tray 604. In one or more embodiments, the tray 604 is slidably coupled to the first device housing 102, and is biased away from the hinge 101 by a spring 607. It should be noted that while a spring 607 is used to bias the tray 604 away from the hinge 101 in this illustrative embodiment, in other embodiments the spring 607 can be replaced by a damper device 612. In one or more embodiments, the damper device 612 comprises a spring with a nested shock damper, which can be pneumatic or hydraulic, to dampen the action of the spring. Other devices suitable for use instead of the spring 607 will be obvious to those of ordinary skill in the art having the benefit of this disclosure.

Once again it should be noted in the discussion of the tray 604 and spring 607 that while only one tray 604 is shown in FIG. 6, the second device housing 103 could likewise include a tray that is slidably coupled to the second device housing 103, and is biased away from the hinge 101 by at least another spring, damper device, or other springy object. In such an embodiment, rather than being coupled to the second device housing 103, the first end of the flexible display (105) could be coupled to the second tray.

In either embodiment, the spring(s) 607 biases the tray 604 away from the hinge 101 to flatten the flexible display (105) when the first device housing 102 pivots about the hinge 101 away from the second device housing 103 to the open position (401). Where a flexible connector is included, it can have its first end coupled to the second device housing 103, while a second end is coupled to a tray 604. In one or more embodiments, the spring 607 biases the tray 604 away from the hinge 101, and thus away from the second device housing 103, to straighten the flexible display (105) when the first device housing 102 is pivoted about the hinge 101 away from the second device housing 103 to the open position (401).

Figure 7:
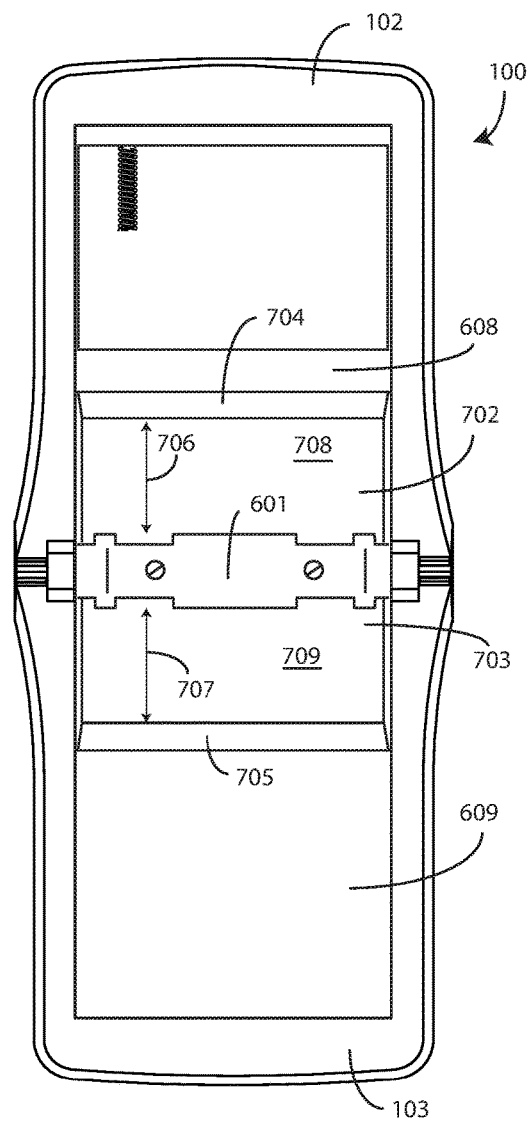
FIG. 7 illustrates a plan view of one explanatory electronic device in accordance with embodiments of the disclosure with the flexible display and support plates removed so that details of the housing are visible.

Turning now to FIG. 7, illustrated therein is another view of the electronic device 100 is shown with the first support plate (602) and the second support plate (603) removed so that additional details of the first device housing 102 and the second device housing 103 can more readily be seen. As shown in FIG. 7, in one or more embodiments each of the first device housing 102 and the second device housing 103 define a support plate receiving recess 702,703. In this illustrative embodiment, the support plate receiving recess 702 of the first device housing 102 is disposed to a first side (605) of the cam 601, while the support plate receiving recess 703 of the second device housing 103 is disposed to the second side (606) of the cam 601.

In one or more embodiments, the support plate receiving recesses 702,703 provide recessed, open space within the first device housing 102 and the second device housing 103 that allows the flexible display (105) room to form a service loop when the first device housing 102 and the second device housing 103 pivot about the hinge 101 to the closed position (201). Such a service loop will be shown below with reference to FIG. 8. This service loop occurs due to the fact that the flexible display (105) deforms when the first device housing 102 pivots about the hinge 101 relative to the second device housing 103 from the axially displaced open position (401) to the closed position (201).

In one or more embodiments, each support plate receiving recess 702,703 comprises an inclined plane 704,705. In this illustrative embodiment, the first support plate receiving recess 702 defines an inclined plane 704 that is disposed distally a predefined distance 706 across a bottom surface 708 of the first support plate receiving recess 702 from the cam 601. Similarly, the second support plate receiving recess 703 defines an inclined plane 705 that is disposed distally a predefined distance 707 across a bottom surface 709 of the second support plate receiving recess 703 from the cam 601.

In this illustrative embodiment, the first device housing 102 and the second device housing 103 each define linear recesses 608,609 into which the flexible display may be positioned. In such an embodiment, each support plate receiving recess 702,703 is disposed between a respective linear recess 608,609 and the hinge 101. For example, in this illustrative embodiment the support plate receiving recess 702 of the first device housing 102 is disposed between the linear recess 608 of the first device housing 102 and the hinge 101. Similarly, the support plate receiving recess 703 of the second device housing 103 is disposed between the linear recess 609 of the second device housing 103 and the hinge 101.

Figure 8:
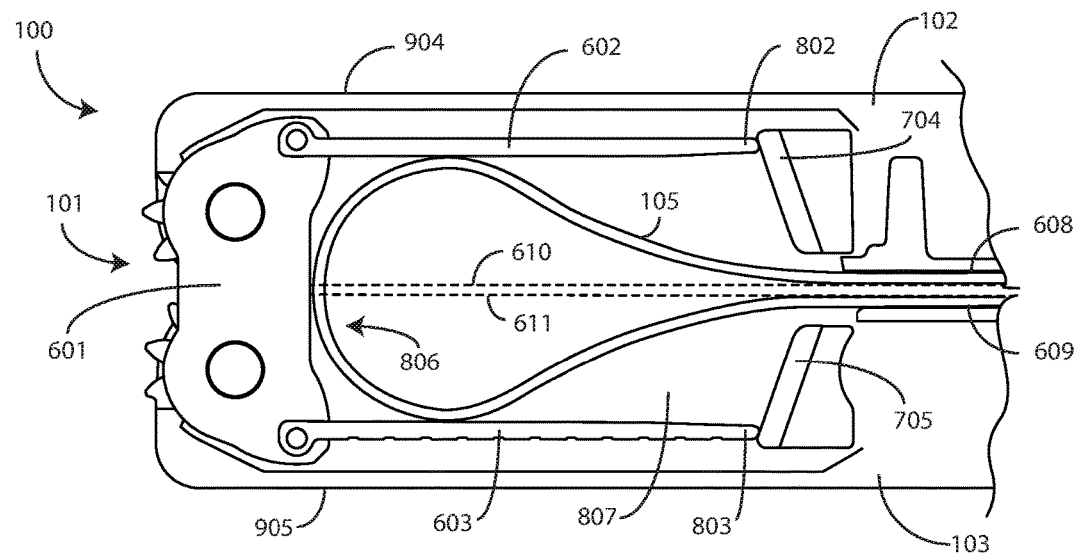
FIG. 8 illustrates a cut away view of a hinge portion of an electronic device in accordance with one or more embodiments of the disclosure when the electronic device is in the closed position.

Turning now to FIG. 8, illustrated therein is a cut away view of the electronic device 100. In this illustration, the flexible display 105 is positioned within the linear recesses 608,609 of the first device housing 102 and the second device housing 103, respectively, with a first end of the flexible display 105 is coupled to the tray (604) in the first device housing 102 and a second end of the flexible display 105 coupled to the second device housing 103.

As shown in FIG. 8, the first device housing 102 and the second device housing 103 have been pivoted about the hinge 101 to the closed position (201). In one or more embodiments, when this occurs, a distal end 802,803 of each of the first support plate 602 and the second support plate 603 travels along its respective inclined plane 704,705 between a first position (shown in FIG. 9) within the first device housing 102 and the second device housing 103, respectively, to a second position (shown in FIG. 8) within the first device housing 102 and the second device housing 103, respectively.

Figure 9:
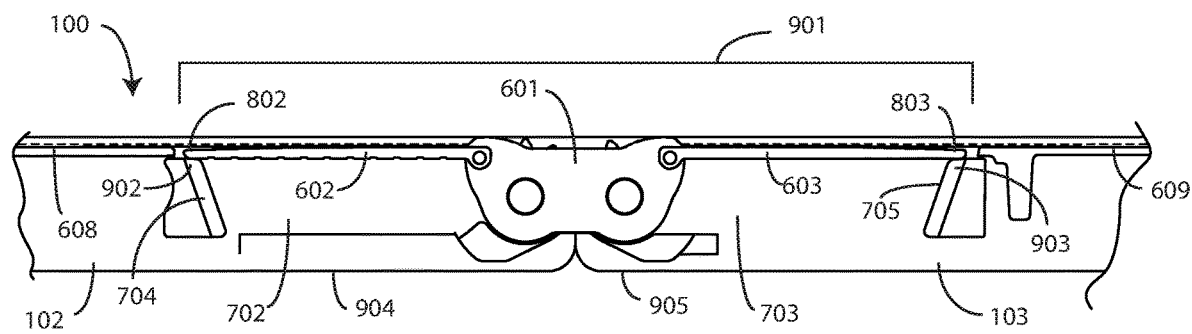
FIG. 9 illustrates a cut away view of a hinge portion of an electronic device in accordance with one or more embodiments of the disclosure when the electronic device is in the open position.

The distal ends 802,803 of each of the first support plate 602 and the second support plate 603 therefore travel, in one or more embodiments, along their respective inclined planes 704,705 between the first position of FIG. 9 within the first device housing 102 and the second device housing 103, respectively, to the second position of FIG. 8 within the first device housing 102 and the second device housing 103, respectively, when the first device housing 102 and the second device housing 103 pivot about the hinge 10 from an axially displaced open position (401) to the closed position (201) of FIG. 8. When this occurs, the first support plate 602, the cam 601, and the second support plate 602 define boundaries within which the flexible display 105 defines a service loop 805. The area opened for the service loop 805 by the translation of the first support plate 602 and the second support plate 602, in one embodiment, has a radius of at least five millimeters. Such a radius prevents the flexible display 105 from kinking or folding. It also works to minimize mechanical memory problems when the first device housing 102 and the second device housing 103 pivot about the hinge 101 to the open position (401).

Turning now to FIG. 9, the first device housing 102 and the second device housing 103 have been rotated about the hinge 101 to the axially displaced open position (401). When this occurs, due to the action of the cam 601, the distal ends 802,803 of the first support plate 602 and the second support plate 603 translate up their respective inclined planes 704, 705 from the second position of FIG. 8 to the first position shown in FIG. 9. In the illustrative embodiment of FIG. 9, when the distal ends 802,803 of the first support plate 602 and the second support plate 603 fully translate up their respective inclined planes 704,705 from the second position of FIG. 8 to the first position shown in FIG. 9, they sit atop ends 902,903 of the inclined planes 704,705.

In this position, and as shown in FIG. 9, when the distal ends 802,803 of the first support plate 602 and the second support plate 603 fully translate up their respective inclined planes 704,705 from the second position of FIG. 8 to the first position shown in FIG. 9, the first support plate 602, the cam 601, and the second support plate 603 bridge the linear recess 608 of the first device housing 102 and the linear recess 609 of the second device housing 103 when the first device housing 102 and the second device housing 103 are in an axially displaced open position shown in FIG. 9.

By comparing FIG. 8 and FIG. 9, a number of characteristics of embodiments of the disclosure can be seen. For example, in this illustrative embodiment the support plates 602,603 are closer to the flexible display 105 when in the first position of FIG. 9, and can therefore provide mechanical support for the flexible display 105 by bridging the linear recess 608 of the first device housing 102 and the linear recess 609 of the second device housing 103 when the first device housing 102 and the second device housing 103 are in an axially displaced open position shown in FIG. 9. By contrast, as shown in FIG. 8, the support plates 602,603 and are farther from the flexible display 105 when in the second position. This occurs due to the fact that the distal ends 802,803 of the each of the first support plate 602 and the second support plate 603 travel along their corresponding inclined plane 704,705 from the first position to the second position when the first device housing 102 and the second device housing 103 pivot about the hinge 101 from the axially displaced open position to the closed position to allow the flexible display to define a service loop 806 shown in FIG. 8.

In one or more embodiments, the support plates 602,603 are farther from exterior surfaces 904,905 of the first device housing 102 and the second device housing 103 when in the first position of FIG. 9, but are closer to those exterior surfaces 904,905 of the first device housing 102 and the second device housing 103 when in the second position of FIG. 8. This results in the second position of FIG. 8 being deeper, relative to the interior surfaces 610,611 of the first device housing 102 and the second device housing 103, respectively, than the first position of FIG. 9.

As shown in FIG. 9, where included, the linear support recesses 608,609 of the first device housing 102 and the second device housing 103 define a support plane for the flexible display 105 on sides of the first device housing 102 and the second device housing 103 exterior of the support plate receiving recesses 702,703 of the first device housing 102 and the second device housing 103, respectively. However, the first support plate 602, the cam 601, and the second support plate 603 bridge this support plane of the first device housing 102 and the support plane of the second device housing 103 in the second position of FIG. 9 to mechanically support the flexible display 105 when the first device housing 102 and the second device housing 103 pivot about the hinge 101 to the axially displaced open position (401) from the closed position (201). In this illustrative embodiment, the first support plate 602, the cam 601, and the second support plate 603 define a contiguous planar surface 901 spanning the support plane defined by the linear recess 608 of the first device housing 102 and the support plane defined by the linear recess 609 of the second device housing 103 in the closed position (201).

Recall from above magnets can be incorporated into the interior surface 610 of the first device housing 102 and the interior surface 611 of the second device housing 103. For instance, magnets can be placed in the first device housing 102 and the second device housing 103 to retain the first device housing 102 and the second device housing 103 in the closed position (201). It should also be noted that where a tray (604) is included, when the first device housing 102 and the second device housing 103 are in the closed position, the tray (604) slides toward the hinge 101, thereby compressing the spring (607) or damper device (612).

As shown in FIGS. 8 and 9, the cam 601 and its corresponding support plates 602,603 serve two functions. First, they provide mechanical support for the flexible display 105 when the first device housing 102 has pivoted about the hinge 101 relative to the second device housing 103 to an axially displaced open position of FIG. 9. However, when the first device housing 102 pivots about the hinge 101 relative to the second device housing 103 to the closed position of FIG. 8 where interior surfaces 610,611 of the first device housing 102 and the second device housing 103 abut, the support plates 602,603 translate along their respective inclined planes 704,705 within the first device housing 102 and second device housing 103, respectively, to recede (from the where interior surfaces 610,611 of the first device housing 102 and the second device housing 103) into the first device housing 102 and second device housing 103.

Said differently, when the first device housing 102 pivots about the hinge 101 relative to the second device housing 103 to the closed position of FIG. 9, the support plates 602,603 move toward the exterior surfaces 902,903 of the first device housing 102 and the second device housing 103, thereby receding "outward" from the interior surfaces 610, 611 of the first device housing 102 and the second device housing 103. This "collapse" of the first support plate 602 and the second support plate 603 creates a cavity 807 in the hinge portion of the electronic device 100 shown in FIG. 8 that allows the flexible display 105 to form the service loop 806. The service loop 805 prevents the flexible display 105 from being damaged or developing memory in the folded position when the electronic device 100 is in the closed position of FIG. 8. Advantageously, hinges 101 configured in accordance with one or more embodiments of the disclosure provide a solution that provides the needed system flexibility by providing support for the flexible display 105 when in the open position of FIG. 9, but allows for a large radius service loop 805 of the flexible display 105 to occur when the electronic device 100 is in the closed position of FIG. 8.

Figure 10:
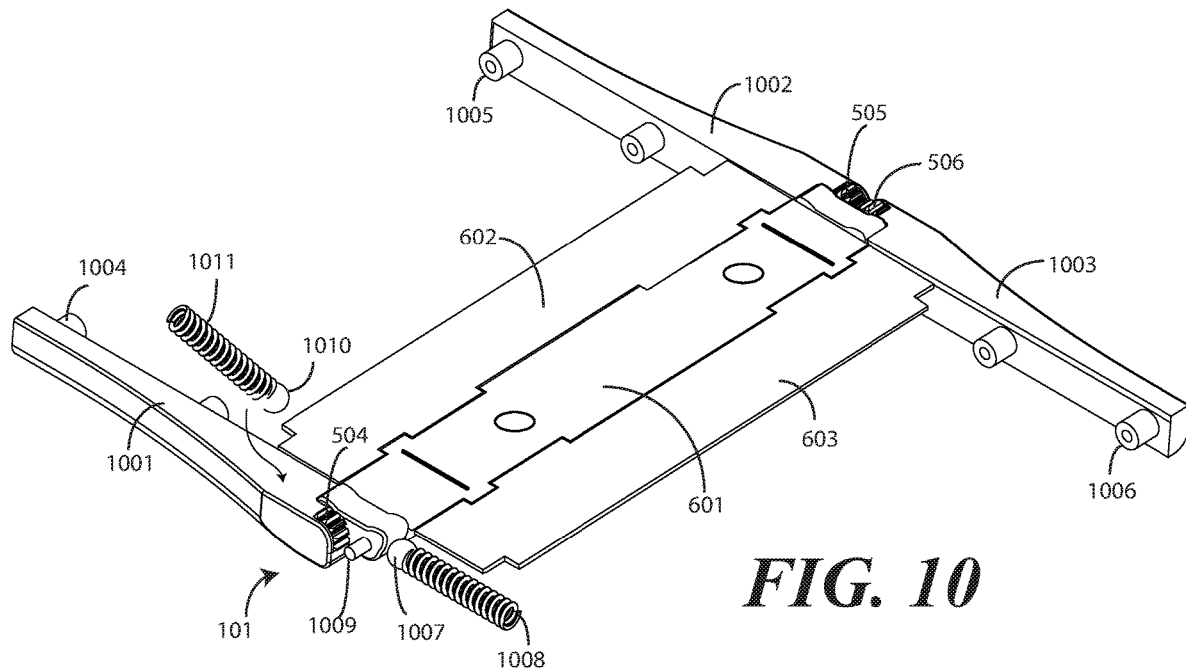
FIG. 10 illustrates one or more explanatory hinge components in accordance with one or more embodiments of the disclosure.

Turning now to FIG. 10, illustrated therein are additional components that may optionally be used in a hinge 101 configured in accordance with one or more embodiments of the disclosure. As shown, in one or more embodiments the hinge 101 includes the cam 601, a first support plate 602 pivotally coupled to a first side of the cam 601, and a second support plate 603 pivotally coupled to a second side of the cam 601. Adjacent to an end of the cam 601 is the first toothed wheel 504, which is defined at the end of a housing member 1001. (The second toothed wheel (505), which engages the first toothed wheel 504 is not shown in FIG. 10 so that a better view of the first toothed wheel 504 can be seen.) Adjacent to a second end of the cam 601 are the third toothed wheel 506 and the fourth toothed wheel 507. In this illustrative embodiment, the cam 601 is positioned between the first toothed wheel 504 and second toothed wheel (505), and the third toothed wheel 506 and the fourth toothed wheel 507, respectively. Accordingly, the cam 601 is disposed father interior of the electronic device than the first toothed wheel 504, the second toothed wheel (505), the third toothed wheel 506, and the fourth toothed wheel 507 in this illustrative embodiment.

In this illustrative embodiment, the housing members 1001,1002,1003 each comprise one or more screw bosses 1004,1005,1006, so that the housing members 1001,1002, 1003 can be coupled to the first device housing (102) and the second device housing (103), respectively. Where these separate housings members 1001,1002,1003 are used, additional components can be incorporated into them. Illustrating by example, in one or more embodiments a follower 1007 and spring 1008 are visible.

In one or more embodiments, a corresponding follower and spring is disposed within each of the other housing members 1001,1002,1003. Accordingly, in one or more embodiments the hinge 101 will include four followers and four springs. Each spring can bias the follower against the end of the cam so as to lock the electronic device using the hinge 101 in either the axially displaced, open position (401) or the closed position (201).

It should be noted that while a springs 1008,1011 are used to bias the followers 1007,1010 against the cam 601 in this embodiment, in other embodiments the springs 1008,1011 can be replaced by a damper device (612) as described above with reference to FIG. 6. Where this is the case, the damper devices (612) can include spring with a nested shock damper, which can be pneumatic or hydraulic, to dampen the action of the spring. Other devices suitable for use instead of the springs 1008,1011 will be obvious to those of ordinary skill in the art having the benefit of this disclosure.

In other embodiments, these separate housing members 1001,1002,1003 will be omitted, with the spring(s) 1008 and follower(s) 1007 simply being incorporated into the first device housing 102 and the second device housing 103. In either case, in one or more embodiments the hinge 101 comprises at least a first follower 1007, biased against a first side of the cam 601 by a spring 1008 disposed between the removed housing member (1101 in FIG. 11) and the first follower 1007, and second follower 1010, biased against a second side of the cam 601 by a spring 1011 disposed between housing member 1001 and the second follower 1010.

Figure 11:
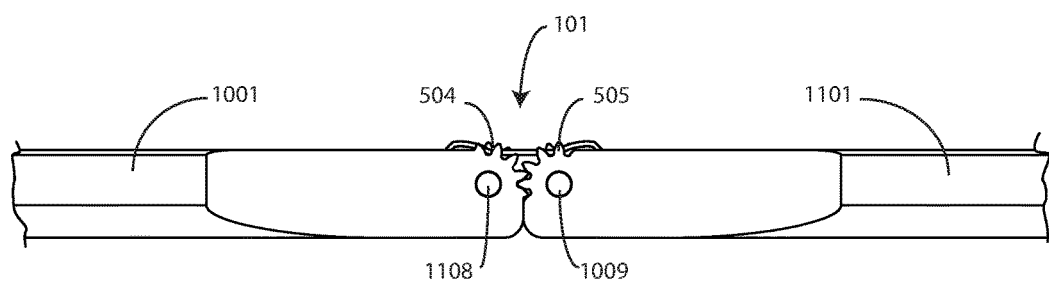
FIG. 11 illustrates one or more explanatory hinge components in accordance with one or more embodiments of the disclosure.

In this illustrative embodiment, the hinge 101 includes a first pivot 1009 and a second pivot, which is engaging the first toothed wheel 504 in FIG. 10, but that can be seen in FIGS. 8, 9, and 11. Each of the first pivot 1009 and the second pivot extends through an aperture in the cam 601, and engages a corresponding aperture in each of the housing members 1001,1002,1003 where they are included. The removal of a fourth housing member, which would cover the first pivot 1009, illustrates how the first pivot 1009 passes through an aperture in the cam 601 and would then, by protruding through the aperture in the cam 601, engage an aperture in the removed housing member, which would be a mirror image of housing member 1003. The same configuration occurs with the remaining housing members 1001, 1002,1003 in one or more embodiments.

FIG. 11 shows a cutaway view of the opposite side of the hinge 101 from that shown in FIG. 10. From this view, the first toothed wheel 504 and the second toothed wheel 505 can be seen. In one or more embodiments housing member 1001, which constitutes an extension of the first device housing (102), comprises at least a first toothed wheel 504. In another embodiment, the first device housing (102) can include an edge that terminates at the first toothed wheel 504. In one or more embodiments housing member 1101, which was removed in FIG. 10, and which constitutes an extension of the second device housing (103), comprises at least a second toothed wheel 505. In another embodiment, the second device housing (103) can include an edge that terminates at the second toothed wheel 505.

In one or more embodiments, the first toothed wheel 504 engages the second toothed wheel 505 when the first device housing (102) pivots about the hinge 101 relative to the second device housing (103). The engagement of the first toothed wheel 504 and the second toothed wheel 505 creates a symmetric angular rotation of the first device housing (102) and the second device housing (103) when the first device housing (102) pivots about the hinge relative to the second device housing (103).

FIG. 11 also shows how the first pivot 1009 and the second pivot 1108 engage housing member 1001 and housing member 1101, respectively, in one or more embodiments. By terminating in housing members 1001,1101 and passing through the cam (601), the cam (601) is pivotable about both the first pivot 1009 and the second pivot 1108.

Figure 12:
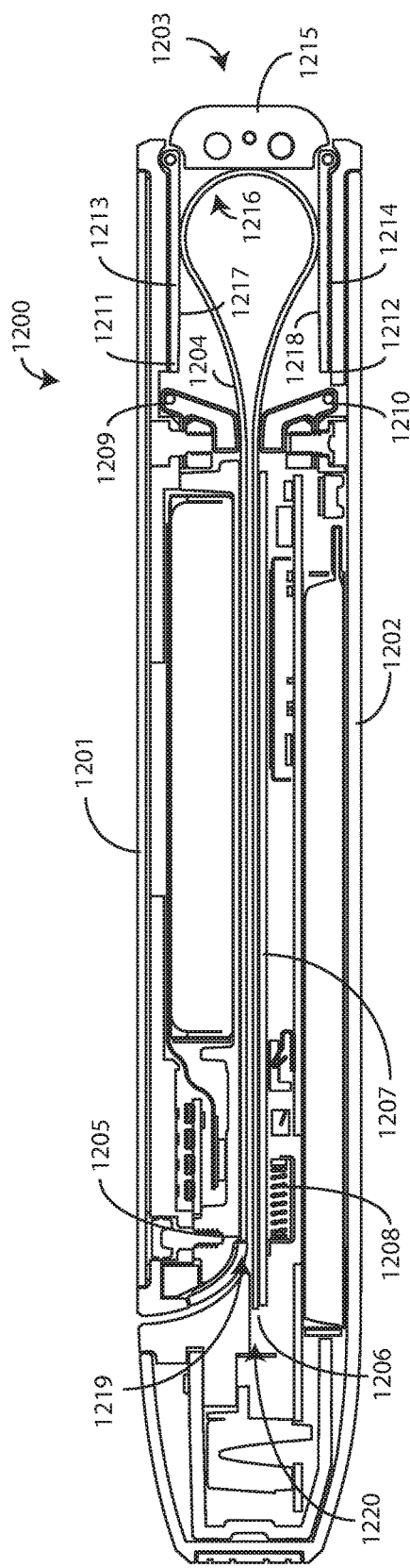
FIG. 12 illustrates a cut away view of another electronic device in accordance with one or more embodiments of the disclosure in the closed position.

Turning now to FIG. 12, illustrated therein is another electronic device 1200 configured in accordance with one or more embodiments of the disclosure. As with the electronic device (100) of FIG. 1, in one or more embodiments the electronic device 1200 of FIG. 12 includes a first device housing 1201 and a second device housing 1202. A hinge 1203 couples the first device housing 1201 to the second device housing 1202. In one or more embodiments, the first device housing 1201 is pivotable about the hinge 1203 relative to the second device housing 1202. In FIG. 12, the first device housing 1201 and the second device housing 1202 are shown pivoted about the hinge 1203 to the closed position.

In the illustrative embodiment of FIG. 12, a flexible display 1204 is coupled to the first device housing 1201 and the second device housing 1202. In this illustrative embodiment, a first end 1205 of the flexible display 1204 is coupled to the first device housing 1201. A second end 1206 of the flexible display 1204 is coupled to a tray 1207, which is slidably coupled to the second device housing 1202. A spring 1208 is biased between the second device housing 1202 and the tray 1207. In one or more embodiments, the spring 1208 biases the tray 1207 away from the hinge 1203 by applying a loading force against the second device housing 1202. Accordingly, when the first device housing 1201 is pivoted about the hinge 1203 away from the second device housing 1202 to an open position (1301) shown in FIG. 13, the spring 1208 biases the tray 1207 away from both the loading point in the second device housing 1202 and the hinge 1203, thereby stretching the flexible display 1204, which spans the hinge 1203.

In the illustrative embodiment of FIG. 12, each of the first device housing 1201 and the second device housing 1202 define an inclined plane 1209,1210. In one or more embodiments, a distal end 1211,1212 of the first support plate 1213 and the second support plate 1214 translates along its corresponding inclined plane 1209,1210, i.e., distal end 1211 translates along inclined plane 1209 and distal end 1212 translates along inclined plane 1210, when the first device housing 1201 and the second device housing 1202 pivot about the hinge 1023 from the axially displaced open position (1301) to the closed position, or vice versa.

In this illustrative embodiment, the hinge 1203 comprises a cam 1215, the first support plate 1213 and the second support plate 1214. Each of the first support plate 1213 and the second support plate 1214 defines a first major face 1217 and is pivotally coupled the cam 1215. In this embodiment, the first support plate 1213 is pivotally coupled to a first side of the cam 1215, while the second support plate 1214 is pivotally coupled to a second side of the cam 1215.

Figure 13:
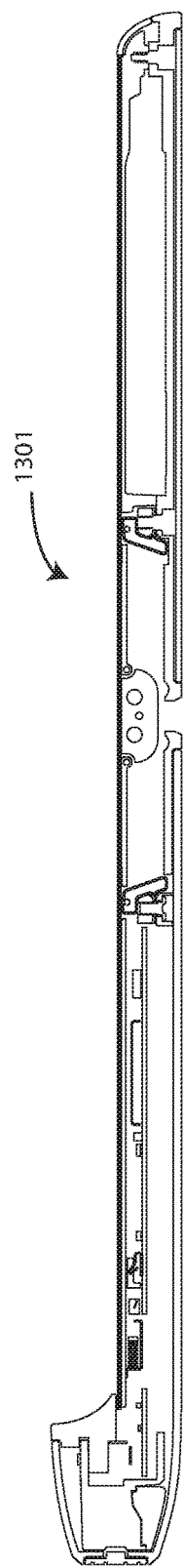
FIG. 13 illustrates a cut away view of another electronic device in accordance with one or more embodiments of the disclosure in the open position.

When the first device housing 1201 and the second device housing 1202 are in an axially displaced open position (1301), shown in FIG. 13, the first major face 1217 of the first support plate 1213 and the second major face 1218 of the second support plate 1214 abut and mechanically support planar surfaces of the flexible display 1204, just as support plates (602,603) did in FIG. 9. However, when the first device housing 1201 and the second device housing 1202 pivot about the hinge 1203 from the axially displaced open position to the closed position shown in FIG. 12, the first major face 1217 of the first support plate 1213 and the second major face 1218 of the second support plate 1214 tangentially abut a service loop 1216 defined by the flexible display 1204.

As previously described, when the first device housing 1201 and the second device housing 1202 are pivoting about the hinge 1203, a distal end 1211,1212 of the first support plate 1213 and the second support plate 1214 abuts and translates along its corresponding inclined plane 1209,1210. Also, as before, the first device housing 1201 and the second device housing 1202 define a linear recess 1219,1220 into which the flexible display 1204 is situated. The first major face 1217 of the first support plate 1213 and the second major face 1218 of the second support plate 1214 define planar extensions of the linear recess 1219 of the first device housing 1201 and the linear recess 1220 of the second device housing 1202 when the first device housing 102 and the second device housing 1202 are in the axially displaced open position (1301) of FIG. 13, just as support plates (602,603) did in FIG. 9. However, as shown in FIG. 12, the first major face 1217 of the first support plate 1213 and the second major face 1218 of the second support plate 1214 are discontiguous with the linear recess 1219,1220 when the first device housing 1201 and the second device housing 1202 housing are in the closed position.

Figure 14:
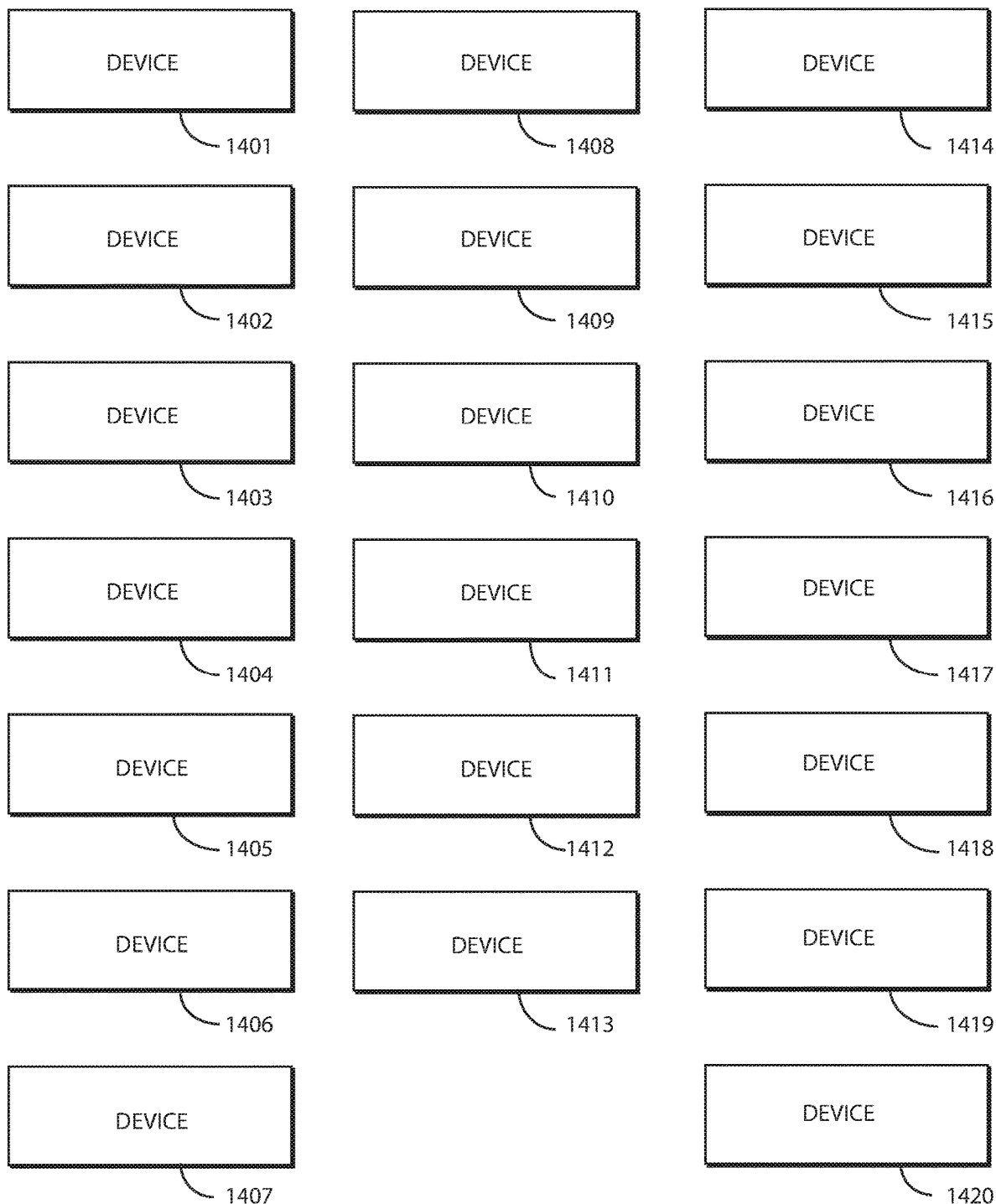
FIG. 14 illustrates various embodiments of the disclosure.

Turning now to FIG. 14, illustrated therein are various embodiments of the disclosure. At 1401, an electronic device comprises a first device housing and a second device housing. At 1401, the electronic device comprises a hinge coupling the first device housing to the second device housing. At 1401, the first device housing is pivotable about the hinge relative to the second device housing.

At 1401, the hinge comprises a cam. At 1401, the hinge comprises a first support plate pivotally coupled to a first side of the cam and extending distally into the first device housing from the first side of the cam. At 1401, the hinge comprises a second support plate pivotally coupled to a second side of the cam and extending distally into the second device housing from the second side of the cam.

At 1401, each of the first device housing and the second device housing define a support plate receiving recess comprising an inclined plane. At 1401, a distal end of each of the first support plate and the second support plate travels along the inclined plane between a first position within the first device housing and the second device housing, respectively, to a second position within the first device housing and the second device housing, respectively, when the first device housing and the second device housing pivot about the hinge from an axially displaced open position to a closed position.

At 1402, the second position of 1401 is deeper within the first device housing and the second device housing, respectively, than the first position. At 1403, each of the first device housing and the second device housing of 1402 define a linear recess. At 1403, the support plate receiving recess is situated between the linear recess and the hinge.

At 1404, the electronic device of 1403 further comprises a flexible display coupled to the first device housing and the second device housing and spanning the hinge. At 1405, the flexible display of 1404 is positioned within the linear recess.

At 1406, the linear recess of 1405 defines a support plane for the flexible display. At 1406, the first support plate, the cam, and the second support plate bridge the support plane of the first device housing and the support plane of the second device housing in the second position to mechanically support the flexible display when the first device housing and the second device housing pivot about the hinge to the axially displaced open position from the closed position.

At 1407, the first support plate, the cam, and the second support plate of 1406 define a contiguous planar surface spanning the support plane of the first device housing and the second device housing in the second position. At 1408, the distal end of the each of the first support plate and the second support plate of 1406 travels along the inclined plane from the first position to the second position when the first device housing and the second device housing pivot about the hinge from the axially displaced open position to the closed position to allow the flexible display to define a service loop.

At 1409, the electronic device of 1407 further comprises a tray. At 1409, the tray is slidably coupled to one of the first device housing or the second device housing. At 1409, a first end of the flexible display is coupled to the tray, while a second end of the flexible display is coupled to another of the first device housing or the second device housing. At 1409, a first spring biases the tray away from the another of the first device housing or the second device housing when the first device housing is pivoted about the hinge away from the second device housing to an open position.

At 1410 a first follower is biased against a first side of the cam of 1407 by a second spring disposed between the first follower and the first device housing. At 1410, a second follower is biased against a second side of the cam by a third spring disposed between the second follower and the second device housing.

At 1411, the first device housing of 1407 comprises at least a first toothed wheel, while the second device housing comprises at least a second toothed wheel. At 1411, the first toothed wheel engages the second toothed wheel when the first device housing pivots about the hinge relative to the second device housing.

At 1412, an electronic device comprises a first device housing and a second device housing. At 1412, each of the first device housing and the second device housing defines a linear recess. At 1412, the electronic device comprises a hinge coupling the first device housing to the second device housing. At 1412, the first device housing is pivotable about the hinge relative to the second device housing.

At 1412, a flexible display is situated in the linear recess of the first device housing and the second device housing. At 1412, the flexible display spans the hinge.

At 1412, the hinge comprises a cam, a first support plate pivotally coupled to a first side of the cam, and a second support plate pivotally coupled to a second side of the cam. At 1412, the first support plate, the cam, and the second support plate bridge the linear recess of the first device housing and the linear recess of the second device housing when the first device housing and the second device housing are in an axially displaced open position. At 1412, the first support plate, the cam, and the second support plate define boundaries within which the flexible display defines a service loop when the first device housing and the second device housing pivot about the hinge from the axially displaced open position to a closed position.

At 1413, the first device housing of 1412 comprises at least a first toothed wheel. At 1413, the second device housing of 1412 comprises at least a second toothed wheel. At 1413, the first toothed wheel engages the second toothed wheel when the first device housing pivots about the hinge relative to the second device housing.

At 1414, the cam of 1413 is disposed farther interior of the electronic device than the at least the first toothed wheel and the at least the second toothed wheel. At 1415, the electronic device of 1414 further comprises a tray. At 1415, the tray is slidably coupled to one of the first device housing or the second device housing.

At 1415, a first end of the flexible display is coupled to the tray. At 1415, a second end of the flexible display is coupled to another of the first device housing or the second device housing. At 1415, a spring biases the tray away from the another of the first device housing or the second device housing when the first device housing is pivoted about the hinge away from the second device housing to an open position. At 1416, each of the first device housing and the second device housing of 1414 define an inclined plane along which a distal end of the first support plate and the second support plate translate when the first device housing and the second device housing pivot about the hinge from the axially displaced open position to the closed position.

At 1417, an electronic device comprises a first device housing and a second device housing. At 1417, the electronic device comprises a hinge coupling the first device housing to the second device housing. At 1417, the first device housing is pivotable about the hinge relative to the second device housing.

At 1417, a flexible display is coupled to the first device housing and the second device housing. At 1417, the flexible display spans the hinge.

At 1417, the hinge comprises a cam, a first support plate defining a first major face and pivotally coupled to a first side of the cam, and a second support plate defining a second major face and pivotally coupled to a second side of the cam. At 1417, the first major face and the second major face abut and mechanically support planar surfaces of the flexible display when the first device housing and the second device housing are in an axially displaced open position. At 1417, the first major face and the second major face tangentially abut a service loop defined by the flexible display when the first device housing and the second device housing pivot about the hinge from the axially displaced open position to a closed position.

At 1418, the first support plate of 1417 is coupled to the cam at a first end. At 1418, the first device housing defines an inclined plane. At 1418, a second, distal end of the first support plate of 1417 abuts and translates along the inclined plane when the first device housing and the second device housing pivot about the hinge from the axially displaced open position to the closed position.

At 1419, the first device housing and the second device housing of 1417 define a linear recess into which the flexible display is situated. At 1419, the first major face and the second major face define planar extensions of the linear recess of the first device housing and the linear recess of the second device housing when the first device housing and the second device housing are in the axially displaced open position. At 1420, the first major face and the second major face of 1419 are discontiguous with the linear recess when the first device housing and the second device housing are in the closed position.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a first device housing and a second device housing; and
    a hinge coupling the first device housing to the second device housing, the first device housing pivotable about the hinge relative to the second device housing;
    the hinge comprising:
        a cam;
        a first support plate pivotally coupled to a first side of the cam and extending distally into the first device housing from the first side of the cam; and
        a second support plate pivotally coupled to a second side of the cam and extending distally into the second device housing from the second side of the cam;
    a flexible display spanning the hinge;
    a tray, slidably coupled to one of the first device housing or the second device housing; and
    at least one spring;
    wherein:
        each of the first device housing and the second device housing define a support plate receiving recess comprising an inclined plane;
        a first end of the flexible display is coupled to the tray;
        a second end of the flexible display is coupled to another of the first device housing or the second device housing;
        the at least one spring biases the tray away from the another of the first device housing or the second device housing when the first device housing is pivoted about the hinge away from the second device housing to an open position; and
        a distal end of each of the first support plate and the second support plate travels along the inclined plane between a first position within the first device housing and the second device housing, respectively, with the distal end situated at a top of the inclined plane, to a second position within the first device housing and the second device housing, respectively, with the distal end situated at a bottom of the inclined plane, when the first device housing and the second device housing pivot about the hinge from an axially displaced open position to a closed position.

2. The electronic device of claim 1, the flexible display defining a service loop when the first device housing and the second device housing pivot about the hinge to the closed position.

3. The electronic device of claim 1, wherein the second position is deeper within the first device housing and the second device housing, respectively, than the first position.

4. The electronic device of claim 1, wherein each of the first device housing and the second device housing define a linear recess, wherein the support plate receiving recess is situated between the linear recess and the hinge.

5. The electronic device of claim 4, further comprising a flexible display spanning the hinge, wherein the flexible display is positioned within the linear recess.

6. The electronic device of claim 5, wherein the linear recess defines a support plane for the flexible display, wherein the first support plate, the cam, and the second support plate bridge the support plane of the first device housing and the support plane of the second device housing in the second position to mechanically support the flexible display when the first device housing and the second device housing pivot about the hinge to the axially displaced open position from the closed position.

7. The electronic device of claim 6, wherein the first support plate, the cam, and the second support plate define a contiguous planar surface spanning the support plane of the first device housing and the second device housing in the second position.

8. The electronic device of claim 1, further comprising a flexible display spanning the hinge, wherein the distal end of the each of the first support plate and the second support plate travels along the inclined plane from the top to the bottom when the first device housing and the second device housing pivot about the hinge from the axially displaced open position to the closed position to allow the flexible display to define a service loop.

9. The electronic device of claim 1, the first device housing comprising at least a first toothed wheel, the second device housing comprising at least a second toothed wheel, the at least the first toothed wheel engaging the at least the second toothed wheel when the first device housing pivots about the hinge relative to the second device housing.

10. The electronic device of claim 1, further comprising at least:
a first follower, biased against a first side of the cam by a first spring disposed between the first follower and the first device housing; and
a second follower, biased against a second side of the cam by a second spring disposed between the second follower and the second device housing.

11. An electronic device, comprising:
a first device housing and a second device housing;
a hinge coupling the first device housing to the second device housing, the first device housing pivotable about the hinge relative to the second device housing;
a flexible display spanning the hinge;
a spring-biased tray, slidably coupled to one of the first device housing or the second device housing, the flexible display coupled to the spring-biased tray and another of the first device housing;

the hinge comprising:
a cam;
a first support plate pivotally coupled to a first side of the cam; and
a second support plate pivotally coupled to a second side of the cam;
the first support plate, the cam, and the second support plate defining a bridge from the first device housing to the second device housing when the first device housing and the second device housing are in an axially displaced open position; and
the first support plate, the cam, and the second support plate defining boundaries within which the flexible display defines a service loop when the first device housing and the second device housing pivot about the hinge from the axially displaced open position to a closed position.

12. The electronic device of claim 11, the first device housing comprising at least a first toothed wheel, the second device housing comprising at least a second toothed wheel, the at least the first toothed wheel engaging the at least the second toothed wheel when the first device housing pivots about the hinge relative to the second device housing.

13. The electronic device of claim 12, the cam disposed farther interior of the electronic device than the at least the first toothed wheel and the at least the second toothed wheel.

14. The electronic device of claim 11, further comprising a spring biasing the spring-biased tray away from the another of the first device housing or the second device housing when the first device housing is pivoted about the hinge away from the second device housing to an open position.

15. The electronic device of claim 11, each of the first device housing and the second device housing defining an inclined plane along which a distal end of the first support plate and the second support plate translate when the first device housing and the second device housing pivot about the hinge from the axially displaced open position to the closed position.

16. The electronic device of claim 15, the inclined plane fixedly situated within the each of the first device housing and the second device housing.

17. An electronic device, comprising:
a first device housing and a second device housing; and
a hinge coupling the first device housing to the second device housing, the first device housing pivotable about the hinge relative to the second device housing;
the hinge comprising:
a cam;
a first support plate pivotally coupled to a first side of the cam and extending distally into the first device housing from the first side of the cam; and
a second support plate pivotally coupled to a second side of the cam and extending distally into the second device housing from the second side of the cam;
a first follower, biased against a first side of the cam by a first spring disposed between the first follower and the first device housing; and
a second follower, biased against a second side of the cam by a second spring disposed between the second follower and the second device housing;
wherein:
each of the first device housing and the second device housing define a support plate receiving recess comprising an inclined plane; and a distal end of each of the first support plate and the second support plate travels along the inclined plane between a first position within the first device housing and the second device housing, respectively, with the distal end situated at a top of the inclined plane, to a second position within the first device housing and the second device housing, respectively, with the distal end situated at a bottom of the inclined plane, when the first device housing and the second device housing pivot about the hinge from an axially displaced open position to a closed position.

18. The electronic device of claim 17, further comprising a flexible display defining a service loop when the first device housing and the second device housing pivot about the hinge to the closed position.

19. The electronic device of claim 18, the flexible display fabricated on a flexible plastic substrate.

20. The electronic device of claim 18, further comprising a flexible conductor positioned between the flexible display and the hinge.

* * * * *